United States Patent [11] 3,633,981

[72] Inventor James L. Suhr
 Kewanee, Ill.
[21] Appl. No. 16,402
[22] Filed Mar. 4, 1970
[45] Patented Jan. 11, 1972
[73] Assignee Kewanee Machinery & Conveyor Co.
 Kewanee, Ill.

[54] DRIVE LINE BEARING AND CONNECTOR
 7 Claims, 3 Drawing Figs.
[52] U.S. Cl. .................................................... 308/27
[51] Int. Cl. ...................................................... F16c 35/06
[50] Field of Search ........................................... 308/27

[56] References Cited
 UNITED STATES PATENTS
 739,598 9/1903 Geisenboner ................ 308/27
 854,715 5/1907 Callan et al. .................. 308/27
 2,389,581 11/1945 Tarr .............................. 308/27
 1,002,378 9/1911 Emmerich ..................... 308/27

Primary Examiner—Martin P. Schwadron
Assistant Examiner—Frank Susko
Attorney—Johnson, Dienner, Emrich, Verbeck & Wagner ABSTRACT: A coupling for connecting adjacent end portions of axially aligned hexagonal-shaped shafts including a unitary coupling body having a longitudinal extending bore adapted to receive the adjacent ends of the shafts, roll pins secured to the coupling body in transverse relation to the longitudinal bore and limiting inward longitudinal movement of the shaft ends, the pins being removable to allow either of the shafts to be moved longitudinally into the bore, and an antifriction bearing disposed about the coupling body and adapted to be secured to a support hanger for supporting the adjacent ends of the shafts in coupled relation.

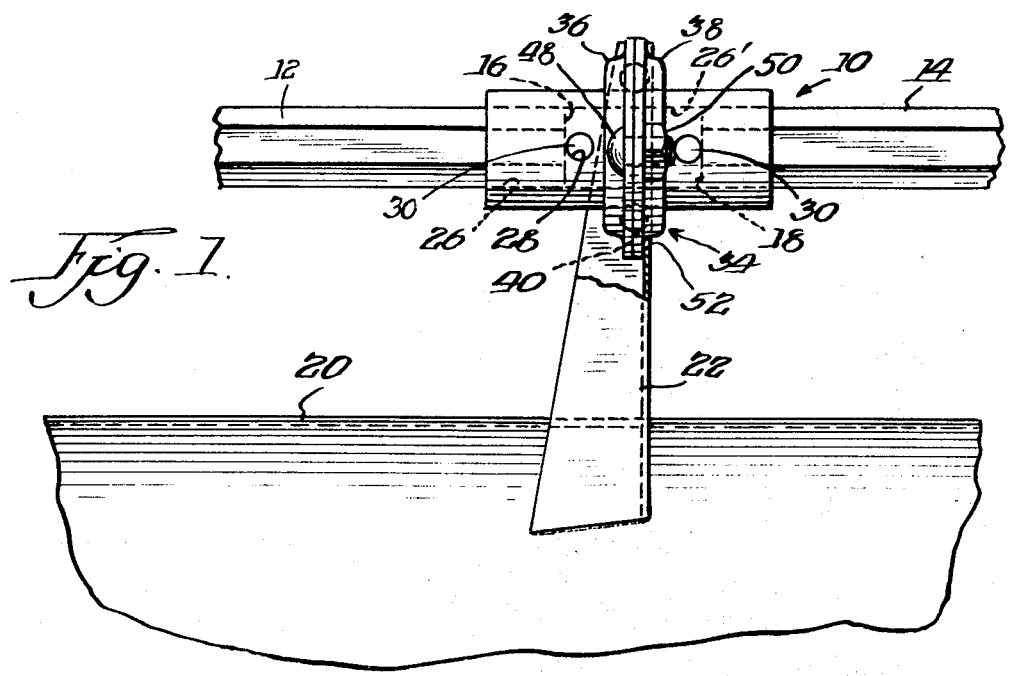
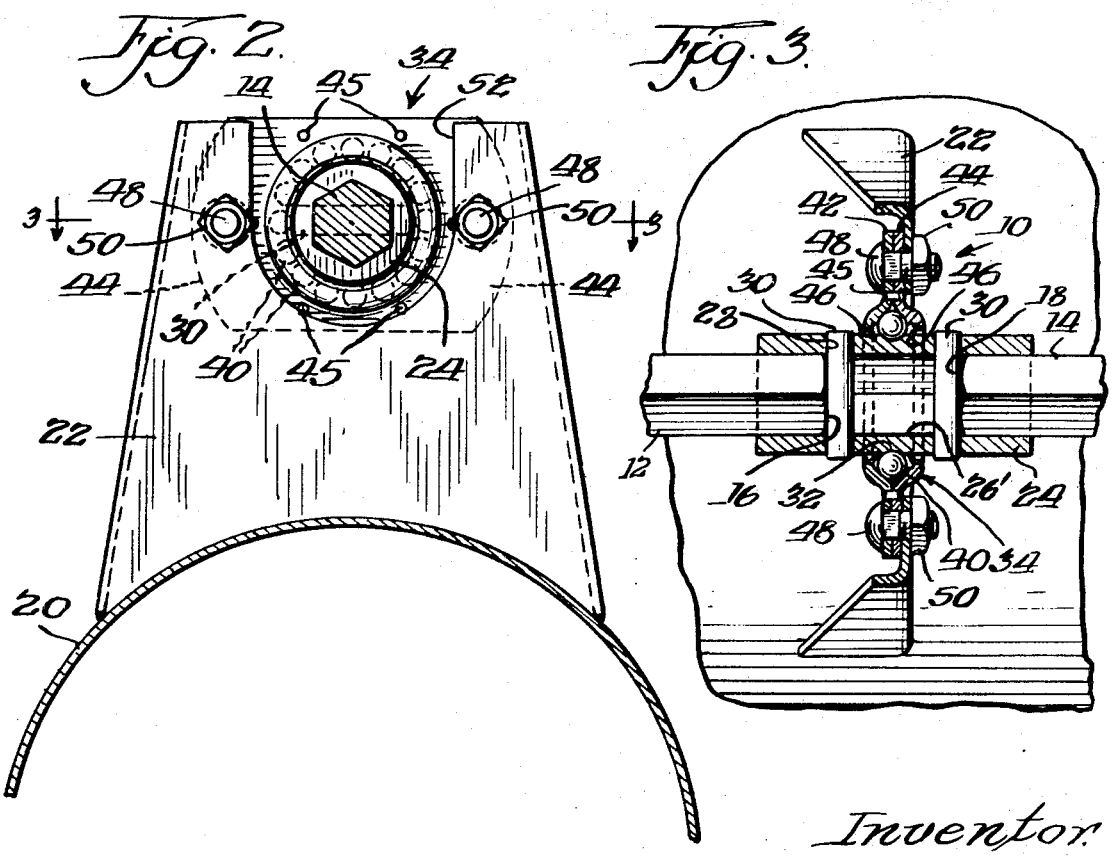

DRIVE LINE BEARING AND CONNECTOR

BACKGROUND OF THE INVENTION:

This present invention relates generally to shaft couplings, and more particularly to a drive line bearing and connector which facilitates connection of adjacent end portions of axially aligned shafts in a quick and efficient manner.

Many types of industrial and agricultural equipment, such as auger conveyors and the like, employ elongated drive line connections between a power source and a driven member. For example in auger conveyors used in the agricultural field to convey grain to elevated storage bins, a drive line is generally supported exteriorly along the length of the auger tube or housing to interconnect a power source disposed at ground level to an auger rotational drive mechanism at the uppermost end of the auger tube. It is common practice that the drive line comprise a plurality of shaft lengths or elongated sections which are supported in axially aligned relation and interconnected in rotary drive relation one to the other. Due to the fact that the power driven auger is of substantial length, often being from 25 to 60 feet long, or even longer, it is necessary to support the drive shaft sections through bearings and support hangers disposed along the length of the auger tube, the adjacent end portions of the aligned shaft sections being coupled through various types of connectors.

The prior art drive line connectors have presented disadvantages which the present invention overcomes. Many of the prior art shaft couplings require that a portion of the coupling be welded or otherwise fixedly secured to one of each pair of axially aligned shafts to be connected. Other prior art drive shaft couplings or connectors require the assembly of separate coupling body components about the adjacent ends of the aligned shafts after the shaft sections have been rotatably mounted in bearing hangers. The bearing hangers have generally been positioned intermediate the ends of the shaft sections. Attempts have been made to eliminate the intermediate bearing supports through providing combination bearings and connectors which are positioned adjacent the opposed ends of the shafts. Such combination bearing-connectors, for example that disclosed in U.S. Pat. No. 548,191, still require the assembly of separable coupling body portions after positioning the same around the adjacent ends of the axially aligned shafts, thereby adding to the installation time and expense. The noted prior art further utilizes a journal or sleeve type bearing which will not accommodate slight eccentricities in shaft alignment.

SUMMARY OF THE INVENTION:

One of the primary objects of the present invention is to provide a drive line bearing and connector which substantially improves efficiency in coupling axially aligned shaft sections over the prior art coupling devices.

Another object of the present invention is to provide a bearing and connector device for use in combination with axially aligned hexagonal-shaped shafts, the connector including a unitary coupling body having a hexagonal-shaped longitudinal bore there-through adapted to receive adjacent end portions of the shafts therein such that either of the shafts may be moved longitudinally into the coupling body to allow the opposite end of the shaft to be inserted into a similar coupling body positioned adjacent the opposite shaft end.

Another object of the present invention is to provide a drive line bearing and connector as described having an antifriction bearing disposed about the coupling body, the bearing comprising a ball bearing adapted to be secured to a support hanger.

Another object of the present invention is to provide a drive line bearing and connector as described having roll pins secured to the coupling body in transverse relation to the longitudinal bore therethrough, the roll pins being installed after the adjacent end portions of aligned shaft sections have been inserted into the coupling body and being disposed inwardly from the ends of the longitudinal bore to limit inward movement of the associated shaft ends.

Further objects and advantages of my invention together with the organization and manner of operation thereof, may best be understood by reference to the following description of a preferred embodiment of the invention when taken in conjunction with the accompanying drawing, in which like reference numerals designate like parts throughout the several views.

BRIEF DESCRIPTION OF THE DRAWING:

FIG. 1 is an elevational view, partially broken away, of a drive line bearing and connector in accordance with the present invention supported along a tubular auger housing;

FIG. 2 is an end elevational view looking from right to left in FIG. 1; and

FIG. 3 is a top sectional view taken substantially along the line 3—3 of FIG. 2, looking in the direction of the arrows.

DESCRIPTION OF A PREFERRED EMBODIMENT

Referring now to the drawings, a drive line bearing and connector in accordance with the present invention is shown generally at reference numeral 10. The drive line bearing and connector 10 is shown, by way of illustration, in combination with axially aligned elongated shafts 12 and 14 having hexagonal-shaped transverse cross sections. The hexagonal shafts 12 and 14 have adjacent opposed end surfaces 16 and 18, respectively, positioned in axial-spaced relation from each other when in assembled relation with the drive line bearing and connector 10. While the shaft portions 12 and 14 are illustrated as being of uniform hexagonal cross section throughout their lengths, the shafts may be made such that only the adjacent end portions received within the connector 10 are of hexagonal transverse configuration, the portions of the shafts intermediate their ends being of any desired configuration such as cylindrical. Moreover, while the shafts 12 and 14 are described as having hexagonal-shaped end portions for cooperation with the connector 10, the present invention readily appreciates that the end portions of the shafts received within the connector 10 may be given any desired polygonal transverse configuration.

The drive line bearing and connector 10 may comprise one of a plurality of similar connectors supported in longitudinally spaced relation along an elongated tubular housing member 20 comprising a portion of the housing cover for an auger as used with agricultural elevator-type conveyors for elevating grain from a ground level receptacle to a truck bed, bin, or other higher receptacle. The spaced connectors 10 support a plurality of shaft sections, such as 12 and 14, in axially aligned relation above the tubular housing 20, the shaft sections comprising a drive line for connecting a power source at ground level to an auger drive mechanism at the opposite end of the auger housing. To this end, a plurality of hanger support members, one of which is shown at 22, are suitably secured to an upper peripheral surface portion of the tubular housing 20 such that each hanger is generally normal to the longitudinal axis of the housing 20 and is adapted to support a drive line bearing and connector 10 as more fully described below.

The drive line bearing and connector 10 includes a unitary coupling body 24 having a generally cylindrical outer peripheral surface and a longitudinally extending bore 26 therethrough. The longitudinal bore 26 has a hexagonal transverse cross-sectional configuration such that the opposite end portions of the bore are adapted to receive the associated adjacent end portions of the shafts 12 and 14 for positive rotary connection therewith. As noted above, the adjacent end portions of the shafts 12 and 14 may be given other polygonal configurations in which case the receiving end portions of the coupling body bore 26 are given similar transverse cross-sectional configurations to receive the associated end portions of the shafts for rotary connection therewith. Noting FIGS. 1 and 3, a portion 26' of the longitudinal bore 26 between the opposed end surfaces 16 and 18 of the shafts 12 and 14 has a transverse cross-sectional configuration sufficient to accommodate either of the shafts 12 and 14 therein such that during assembly of the connector 10 with shafts 12 and 14, either of the shafts 12 and 14 may be moved longitudinally inward into the bore 26.

The coupling body 24 has a pair of longitudinally spaced apertures 28 extending therethrough in transverse relation to the longitudinal axis of the coupling body such that the axes of the apertures 28 intersect the longitudinal axis of the coupling body. The apertures 28 are spaced longitudinally inwardly from the ends of the coupling body and serve to releaseably retain cylindrical roll pins 30. Each of the roll pins 30 has an outer peripheral diameter sufficient to fractionally engage the internal peripheral surface of the associated aperture 28 and has a longitudinal length slightly greater than the diameter of the cylindrical coupling body 24. In this manner, the roll pins 30 can be releasably secured to the coupling body 24 in transverse relation to the longitudinally extending bore 26 and each of the roll pins is spaced longitudinally inwardly from its associated end of the coupling body. In operation, the roll pins 30 limit the extent of longitudinal movement of the associated shafts 12 and 14 inwardly into the coupling body 24 through engagement with the end surfaces 16 and 18 of the shafts. With the frictional retaining fit of the pins 30 within the corresponding apertures 28, they may be readily inserted and removed during assembly of the shafts 12 and 14 with the coupling body 24, but will be fixedly retained within the associated apertures to provide the desired stop means for the shafts 12 and 14 during operation.

As noted above, the coupling body 24 has a generally cylindrical outer peripheral surface. An annular groove 32, having a generally radial or semicircular configuration when considered as in FIG. 3, is formed in the outer peripheral surface of the coupling body 24 centrally along its longitudinal length with the plane of the groove being normal to the longitudinal axis of the coupling body bore 26. The annular groove 32 forms the inner race of antifriction bearing means, indicated generally at 34, disposed about the coupling body 24 and adapted to be secured to the supporting hanger member 22. The antifriction bearing means 34 includes an outer race comprised of annular cooperating raceway members 36 and 38. The raceway members 36 and 38 encage a plurality of ball bearings 40 between the cooperating raceway members and the annular inner race groove 32 in the coupling body 24. The raceway members 36 and 38 have identically shaped diametrically opposed flange portions 42 and 44, respectively, which are secured together in abutting relation through a plurality of circumferentially spaced rivets 45 to establish the outer race of the bearing means 34. The annular raceway members 36 and 38 define circular openings centrally therethrough having diameters slightly greater than the outer diameter of the coupling body 24 to provide clearance between the inner peripheral surfaces of the raceway openings and the outer peripheral surface of the coupling body. It will be understood that the flange portions 42 and 44 of the bearing means 34 lie in a plane generally normal to the longitudinal axis of the bore 26, and that the coupling body 24 may be freely rotated relative to the flange portions through the ball bearings 40. Preferably, an annular seal 46 is secured to the peripheral surface defining the circular central opening in each of the raceway members 36 and 38 for engagement with the peripheral surface of the coupling body 24. Annular grooves may be formed in the peripheral surface of coupling body 24 for cooperation with the innermost annular surface of the seals 46.

The flange portions 42 and 44 of the bearing means 34 provide a means for securing the bearing to the support hanger member 22. To this end, suitable securing means such as a pair of carriage bolts 48 are received through appropriate aligned apertures in the flange portions 42 and 44 of the outer raceway members 36 and 38 and through suitable openings in the upstanding hanger member 22, the ends of the bolts opposite the head portions having nuts 50 secured thereon. Noting FIG. 2, the hanger member is recessed at 52 to receive the bearing means 34 therein for securing it to the hanger member as through the bolts 48.

As noted, drive line bearing and connectors 10 in accordance with the present invention find particular application in coupling axially aligned drive shaft sections such as shown at 12 and 14 which comprise portions of an elongated drive line. In operation, a plurality of drive line bearing and connectors 10 are secured to hanger uprights 22 spaced longitudinally along the length of the auger housing 20 through bolts 48 with the roll pins 30 removed from the coupling bodies 24. Thereafter, with the roll pins 30 removed from the coupling bodies 24 and assuming two of the coupling bodies to be similarly supported in aligned spaced relation along the housing 20 through associated hanger members 22, an end portion of a drive shaft section such as 14 may be readily inserted into the longitudinal bore 26 within the coupling body. The end portion of the shaft 14 is moved longitudinally inwardly into the coupling body bore an extent sufficient to allow the opposite end of the drive shaft section to be inserted into the associated drive line bearing and connector spaced longitudinally along the housing 20 from the connector shown in FIG. 1. The shaft 14 is then moved longitudinally outwardly from the bore 26 of the coupling body 24 of FIG. 1 such that both of the shaft ends are coupled in rotating connection with spaced bearings and connectors 10. The shaft 14 is moved outwardly from the coupling body bore 26 a distance sufficient to allow the roll pin 30 corresponding to the rightmost aperture 28 in the coupling body, as shown in FIG. 1, to be inserted into the rightmost aperture thereby limiting further inward movement of the corresponding end portion of shaft 14.

In similar fashion, with the leftmost roll pin 30 removed from its corresponding aperture 28, the shaft 12 may be inserted into the longitudinal bore 26 of the coupling body and moved longitudinally a distance sufficient to allow the opposite end of the shaft 12 to be axially aligned with and inserted into a coupling body 24 spaced longitudinally to the left of the connector 10 shown in FIG. 1. When the shaft 12 is suitably received within the bores 26 of two axially aligned longitudinally spaced coupling bodies 24, the leftmost roll pin 30 is inserted into its associated aperture 28 and frictionally retained. In this manner, the shaft sections 12 and 14 are retained within spaced drive line bearing and connectors 10 such that rotation of one of the shaft sections through a power source (not shown) will effect rotation of the remaining shaft sections. The bearing means 34 of the connectors 10 provide antifriction rotary support for the shaft sections through enhancing rotational movement of the coupling bodies 24.

While the coupling body 24 has been described and illustrated in conjunction with shafts 12 and 14 of generally similar polygonal cross-sectional configuration and size, the present invention contemplates that the drive line bearing and connector 10 may be modified for combination with shafts of generally different cross-sectional size. To this end, the opposite end portions of the longitudinal bore 26 through the coupling body 24 would be given cross-sectional configurations similar to the associated shaft end portions which are to be received in rotating connection therewith. The portion 26' of the longitudinal bore 26 between the bore end portions receiving the ends of the shafts would be formed of a sufficient cross-sectional configuration to receive either of the shaft ends therein whereby to allow longitudinal movement of either of the shaft ends into the coupling body when the associated roll pins 30 are removed from their associated retaining apertures 23.

The combination drive line bearing and connector 10 described and illustrated herein serves as both a bearing support for the axially aligned shafts 12 and a drive coupling therebetween, thus eliminating the need for intermediate coupling or connector members disposed between bearing supports secured longitudinally along the auger housing 20.

While a preferred embodiment of the present invention has been described and illustrated, it will be obvious to those skilled in the art that changes and modifications may be made therein without departing from the present invention in its broader aspects.

I claim:

1. In combination with axially aligned shafts having generally adjacent polygonal-shaped end portions, a drive line bearing and connector for coupling the adjacent end portions of the shafts, comprising, a unitary coupling body having a longitudinally extending bore therethrough, at least the outer end portions of said bore transverse cross-sectional configurations to receive the adjacent end portions of the shafts therein for rotary connection therewith, the portion of said bore between said polygonal shaped outer end portions being of a cross-sectional configuration to allow either of said shafts to be moved longitudinally into said bore, stop means removably secured to said coupling body in generally transverse relation to said longitudinally extending bore, said stop means being positioned inwardly from each end of said bore to limit longitudinal inward movement of the shafts within said bore, and antifriction means disposed about said coupling body and including means for securing the bearing and connector to a supporting hanger member.

2. The combination of claim 1 wherein said limiting means comprise pin means releaseably secured to said coupling body.

3. The combination of claim 1 wherein said coupling body has transversely disposed apertures therethrough intersecting said longitudinally extending bore inwardly from each end thereof, and wherein said limiting means comprise pin means releaseably secured within each of said transverse apertures.

4. The combination of claim 1 wherein said longitudinally extending bore is uniformly hexagonal in transverse cross section throughout its full longitudinal length.

5. The combination of claim 1 wherein said antifriction means comprises a ball bearing including a plurality of encaged balls having their center axes lying in a plane generally normal to the longitudinal axis of said longitudinally extending bore.

6. The combination of claim 5 wherein said coupling body has an annular groove formed in the peripheral surface thereof providing the inner race for cooperation with said bearing balls.

7. The combination of claim 5 wherein said ball bearing includes an outer race having means for securing said bearing means and said coupling body to a support hanger for support thereof.

* * * * *

UNITED STATES PATENT OFFICE
CERTIFICATE OF CORRECTION

Patent No. 3,633,981　　　　　　　　　Dated January 11, 1972

Inventor(s) James L. Suhr

It is certified that error appears in the above-identified patent and that said Letters Patent are hereby corrected as shown below:

Column 5, line 2, delete hyphen between polygonal and shaped.

Column 5, line 6, after "bore" insert -- having polygonal --.

Column 5, line 6, delete hyphen between cross and sectional.

Column 5, line 10, delete hyphen between cross and sectional.

Column 5, line 16, add hyphen between anti and friction.

Column 6, line 8, add hyphen between anti and friction.

Signed and sealed this 6th day of June 1972.

(SEAL)
Attest:

EDWARD M. FLETCHER, JR.　　　　　　ROBERT GOTTSCHALK
Attesting Officer　　　　　　　　　Commissioner of Patents